No. 783,345. PATENTED FEB. 21, 1905.
J. F. WITTEMANN.
REFRIGERATING APPARATUS.
APPLICATION FILED FEB. 28, 1900.
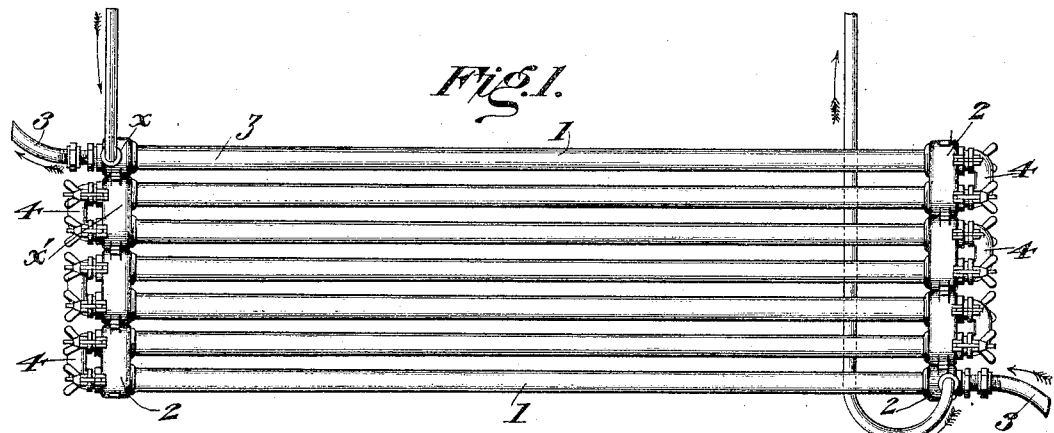
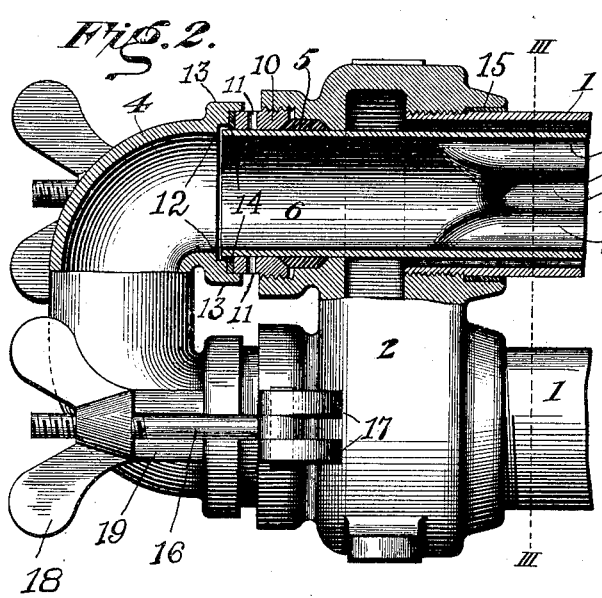
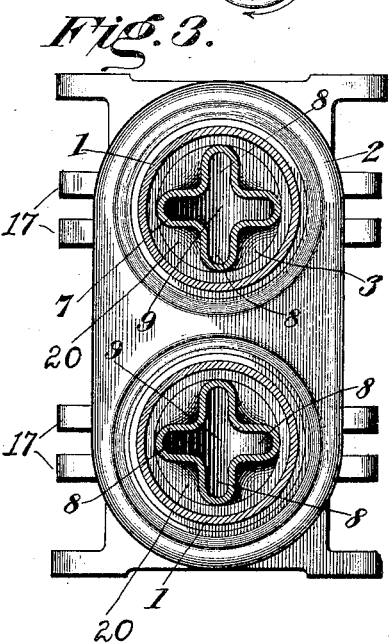
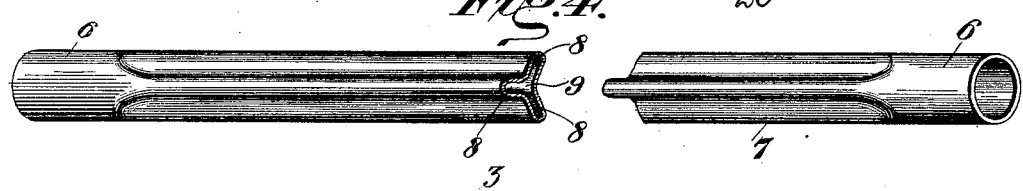
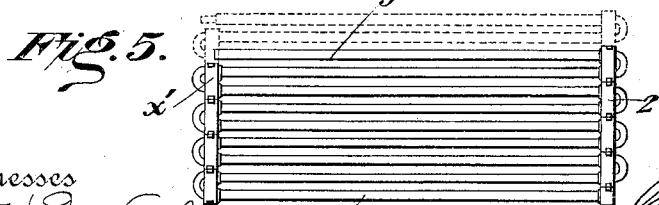
Witnesses
Inventor
Jacob F. Wittemann
his Attorney No. 783,345.         Patented February 21, 1905.

UNITED STATES PATENT OFFICE.

JACOB FREDERIC WITTEMANN, OF BROOKLYN, NEW YORK, ASSIGNOR TO THE WITTEMANN COMPANY, OF NEW YORK, N. Y., A CORPORATION OF NEW YORK.

REFRIGERATING APPARATUS.

SPECIFICATION forming part of Letters Patent No. 783,345, dated February 21, 1905.

Application filed February 28, 1900. Serial No. 6,870.

*To all whom it may concern:*

Be it known that I, JACOB FREDERIC WITTEMANN, a citizen of the United States, residing at Brooklyn, in the county of Kings and State of New York, have invented certain new and useful Improvements in Refrigerating Apparatus; and I do hereby declare the following to be a full, clear, and exact description of the invention, such as will enable others skilled in the art to which it appertains to make and use the same.

My invention relates to apparatus for producing changes in the temperature of the substance treated, and is herein shown and described as embodied in a counter-current apparatus for cooling beer and the like, although it will be obvious that said invention is in no wise limited to such application. In devices of this nature as heretofore constructed several disadvantages have arisen. Among these are, first, the liability of separation between the joints, owing to the uneven expansion and contraction of the different-size pipes employed; second, the inability to inspect, detach, and clean the pipes which carry the beer or other substances to be treated; third, the difficulty of maintaining as great a difference between temperatures of the refrigerant and liquid being treated as may be desired, the result being a waste of the cooling medium, and, fourth, either an uneven or insufficient exposure of the body of liquid to be cooled to the cooling-surface, necessitating the employment of too large or cumbersome an apparatus for effecting the operation of cooling, thus exposing the liquid to contamination by friction or otherwise by excessive contact with metal surfaces.

The objects of the present invention are to produce an efficient apparatus of the character described and to overcome the various objections mentioned; to provide for unequal expansion of the liquid and refrigerant pipes without liability of leakage at the joints; to permit inspection of the liquid-pipes without affecting the joints between the same and the refrigerant-pipes; to permit detachment of said liquid-pipes, but to obviate all liability of dislocation thereof by the expansive force of the refrigerant; to expose the liquid in the best manner to the action of the refrigerant and secure an even, rapid, and thorough cooling, and also to provide a simple and inexpensive construction which will occupy but narrow space, may be easily transported, and can be readily enlarged or diminished to increase or decrease the path of travel of the liquid, and consequently the time during which it is subjected to the action of the refrigerant.

The invention will first be described with reference to the accompanying drawings and will then be pointed out more particularly in the claims following this description.

In said drawings, Figure 1 is a side elevation of an apparatus constructed in accordance with the present invention. Fig. 2 is an enlarged fragmentary view, partly in section, showing a double header with its connected pipes. Fig. 3 is a transverse sectional elevation on the line III III of Fig. 2. Fig. 4 is a perspective view of one of the beer-pipes slightly modified in cross-section, and Fig. 5 is a view in diagram showing the manner in which the present apparatus can be enlarged or reduced in size.

As previously indicated, the embodiment of the present invention herein described and illustrated is in a counter-current cooler, and in the drawings 1 indicates the outer horizontal pipes through which passes the ammonia or other cooling medium, these pipes being arranged in a vertical series and having their ends secured in hollow headers 2. As shown, the ends of said pipes are screwed into said headers, and fluid-tight joints are formed by packings 15. These headers form, in effect, a supporting-frame for the pipes, those at each end of the apparatus being superimposed and detachably connected together in any desired and convenient manner. The headers at the inlet and outlet ends of the system of pipes are single, each communicating with but one pipe 1, while the remaining headers are double, each communicating with two adjacent pipes. The double headers at the opposite ends of a given pipe extend in opposite directions and communicate one with the adjacent upper pipe and the other with the adjacent lower pipe. An inlet for the cooling medium or refrigerant is provided in the first header of the system, and an outlet for said medium is provided in the last header. Thus, the first (shown as the upper) header communicating with the refrigerant-supply and with one end of the upper pipe 1, the other end of the first pipe communicating by a double header with the second pipe, the remainder of the pipes being correspondingly connected by double headers, the delivery end of the last pipe communicating with the last single header, and the outlet or return pipe for the refrigerant also leading from said last header, there is derived a continuous unbroken passage for the cooling medium or refrigerant.

The pipes 3 for the passage of the beer or other liquid to be cooled are contained within the respective pipes 1, and their ends project beyond the ends of said outer pipes 1 and extend entirely through the respective headers. The said inner pipes are connected together at their alternate adjacent ends, as by the removable bends 4, while the inlet end of the first (here shown as the lower) pipe 3 and the outlet end of the last pipe are respectively connected with the source the beer-supply and the receptacle for the cooled beer. Thus the inner pipes 3 and bends 4 produce a continuous channel for the passage of the beer or other liquid, and in the form of device illustrated the beer and refrigerant have respective counter-currents. Manifestly, however, the beer or refrigerant can be admitted to the pipes and delivered therefrom at ends other than those just described, and the beer and refrigerant can, if desired, be caused to flow in the same direction.

It is to be noted that by arranging the pipes in a pile, as indicated, the apparatus is made quite narrow, so that it occupies but small space and is easily transported. Furthermore, by reason of the specified arrangement of pipes and detachable headers additional pipes, with their headers and connecting-bends, can be inserted, or pipes in the apparatus can be removed, whereby the length of the channels for the beer and refrigerant can be increased or diminished, as desired. For example, if it be desired to lengthen the channels, and thus cause the refrigerant to act upon the beer or other liquid for a longer period of time, the single header $x$ and its adjacent double header $x'$ can be disconnected, the pipe $z$ then disconnected from the header $x$, and a new section can be inserted, this section being as illustrated in dotted lines in Fig. 5 and comprising a header adapted to fit upon the header $x'$, a pipe extending from the upper portion of said new header and having at its other end a double header extending upwardly and bearing a second pipe, the said two pipes in the second-mentioned header being suitably connected by a bend secured to the header as before. The single header $x$ is then attached to the end of the upper newly-inserted pipe and is connected to the new double header, which is secured to the header $x'$. Thus the upper pipe upon the new header takes the place formerly occupied by the pipe $z$, the continuous channel in the pipes being thereby restored.

As previously described, the outer pipes 1 connect with the headers, and the inner pipes 3 extend entirely through said headers and are connected to their adjacent pipes by means of the bends 4. Said inner pipes fit within suitable stuffing-boxes or packing devices in the outer walls of the headers—i. e., the walls nearer the ends of the inner pipes—and the bends are firmly but preferably detachably secured in position over the ends of the inner pipes in any desired manner. Thus by removing the appropriate bend any desired inner pipe can be inspected, cleaned, or withdrawn. Furthermore, as the bends are fastened to the headers and fit over the ends of the inner pipes, which latter merely rest in the stuffing-boxes, said inner pipes are allowed a certain amount of play longitudinally, thus permitting unequal expansion or contraction of the two sets of pipes without danger of leakage at the joints.

The stuffing-boxes, as shown, consist of packings 5, confined within annular recesses in bosses on the outer walls of the headers and compressed therein around the inner pipes by packing-nuts 10, though other suitable packing devices may be substituted. The packing-nuts 10 are preferably formed with circular heads and provided with sockets 11 for engagement by a spanner, though the usual polygonal wrench-surfaces may be adopted in some cases. The return-bends 4 are preferably formed with annular recesses or rabbets 12, which fit over the extremities of the inner pipes, suitable expansion-spaces being allowed between said extremities and the shoulders formed by said rabbets. Thus the necessary longitudinal play of the inner pipes in their stuffing-boxes is permitted, while yet the movement is properly limited, and the bends being secured to the headers instead of to the inner pipes the liability incident to this class of devices of having said inner pipes blown out by the great force of the ammonia-gas or other refrigerant is entirely obviated. The bends are also preferably formed with incut or rabbeted end flanges 13, which fit against and over the circular ends of the packing-nuts 10, suitable packing-rings 14 being interposed, whereby fluid-tight joints are formed between the bends and inner pipes independent of the stuffing-boxes or expansion-joints between said pipes and the hollow headers. It will be observed, therefore, that unequal expansion or contraction of the two sets of pipes will not affect the joints between the bends and inner pipes, while said bends may be removed for inspection or other purposes without affecting the joints between the headers and inner pipes and causing leakage of the refrigerant. The return-bends 4 may be secured to the headers by any suitable means permitting the arrangement of joints described. As shown, they are fastened by swinging bolts 16, pivoted to lugs 17 on the headers, and thumb-nuts 18 screwed thereon against shoulders or lugs 19 on the bends. On loosening the thumb-nuts the bolts may be swung out of the way to permit detachment of the return-bends.

As illustrated at 6, the pipes 3 are each preferably formed perfectly round for a suitable distance from each end by which to adapt the same to fit the stuffing-boxes, while the intermediate portion 7 of each pipe is crimped, corrugated, or indented longitudinally, as shown, so as to form longitudinal passages 20 between the pipe 3 and the pipe 1 for the flow of the refrigerating medium and divide the inner pipe interiorly into a series of longitudinal passages 8, surrounding a central passage 9, all of said passages being of substantially equal diameters or uniform width, so that the beer or other liquid will be evenly exposed to the action of the refrigerant. Said pipe 1 can be thus formed substantially triangularly in cross-section, as shown in Fig. 4; but preferably the same is so corrugated as to produce substantially a cruciform cross-section, as shown in Fig. 3. It will thus be seen that the effect of the construction explained is to expose a greater cooling-surface for the beer or other liquid acted upon, and also in virtue of this construction the tendency is to break up or divide the moving column of liquid, whereby the cooling or refrigerating effect is rendered much more rapid and perfect. Preferably the greatest diameter of the pipe at its corrugated portion does not exceed the diameter of the end portions of the pipe, thus permitting the entire pipe to be withdrawn from the header.

The form of corrugation which I preferably employ is such as will allow of inspection and access of a brush or similar cleaning device, as it is of great importance in the brewing practice, as well as the treatment of fermented beverages generally, to have every part of the surface coming in contact with them thus accessible.

Although I have described my invention as embodied in an apparatus for cooling beer, I do not desire to be understood as limited to such an embodiment, for manifestly other liquid substances can be treated in the same apparatus, and the substance to be treated can also be heated instead of cooled, or they may be subjected alternately to a treatment of heating and cooling in any manner desired.

Having thus described my invention, what I claim as new, and desire to secure by Letters Patent, is—

1. In a refrigerating apparatus, a structure comprising a series of outer pipes having hollow connections at adjacent ends, a corresponding series of inner pipes having their ends extending therethrough and secured therein by expansion-joints, and return-bends detachably secured to said structure and connected to the adjacent ends of said inner pipes by independent expansion-joints, substantially as described.

2. In a refrigerating apparatus, a structure comprising a series of outer pipes having hollow connections at adjacent ends, a corresponding series of inner pipes having their ends extending therethrough, stuffing-boxes in the outer ends of said structure inclosing said inner pipes, and return-bends detachably secured to said structure and fitting over and connecting adjacent ends of said inner pipes so as to permit a limited movement of one set of pipes with respect to the other, substantially as described.

3. In a refrigerating apparatus, a structure comprising a series of outer pipes having hollow connections at adjacent ends, a corresponding series of inner pipes having their ends extending therethrough, stuffing-boxes in the outer ends of said structure inclosing said inner pipes, and return-bends secured to said structure and fitting over and connecting adjacent ends of said inner pipes, said bends having their ends connected by joints to the stuffing-box followers, substantially as described.

4. In a refrigerating apparatus, a structure comprising a series of outer pipes having hollow connections at adjacent ends, a corresponding series of inner pipes having their ends extending therethrough, packing devices inclosing said inner pipes, and return-bends secured to said structure and connecting adjacent ends of said inner pipes, said bends being connected to said inner pipes by independent expansion-joints and having internal rabbets or recesses fitting over the ends of said pipes and permitting a limited longitudinal movement thereof, substantially as described.

5. In a refrigerating apparatus, hollow headers at opposite ends provided with openings in their inner and outer walls, a series of pipes between said headers connected with the inner openings, a second series of pipes inclosed within the others and extending through the outer openings of the headers and secured therein by expansion-joints, and return-bends secured to said headers and connected to adjacent ends of said inner pipes by independent expansion-joints, substantially as described.

In testimony whereof I affix my signature in presence of two witnesses.

JACOB FREDERIC WITTEMANN.

Witnesses:
V. C. H. SCHWARZ,
L. J. ULRICH.